June 13, 1950 R. C. BRADWELL ET AL 2,511,525
MECHANIC'S TOOL
Filed June 13, 1947
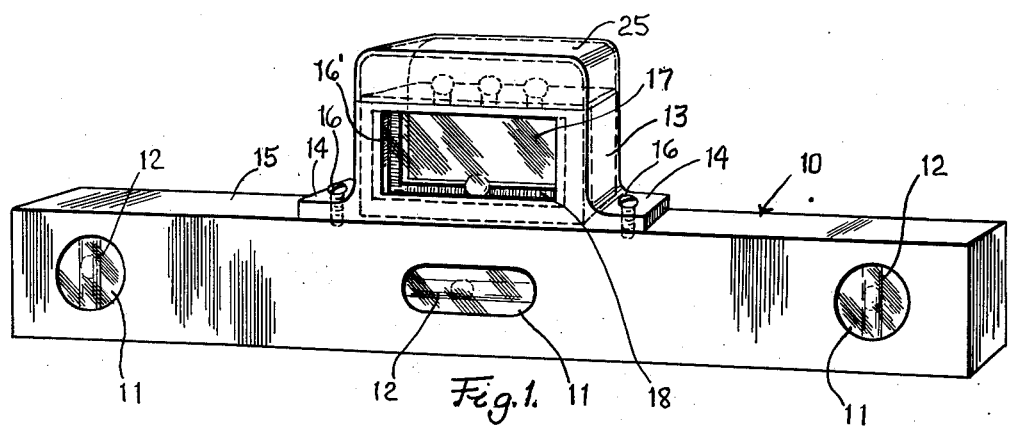
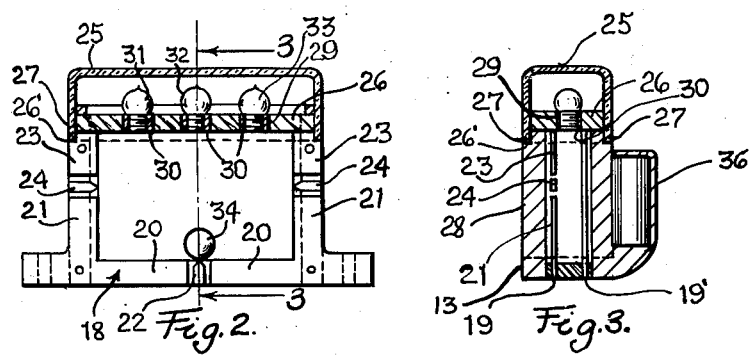
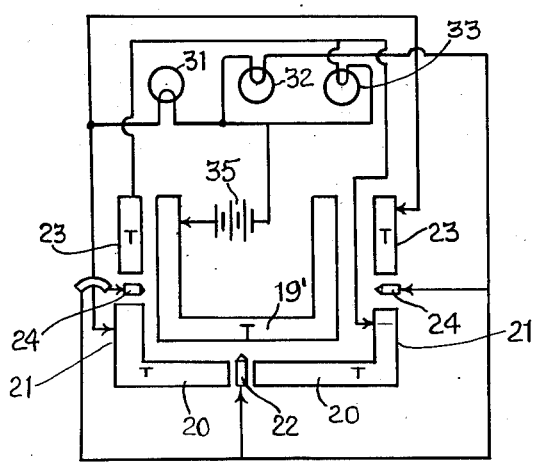
INVENTORS.
Raymond C. Bradwell
and Alfred R. Miller
BY Clarence E. Threedy
Their Attorney.

Patented June 13, 1950

2,511,525

UNITED STATES PATENT OFFICE 2,511,525

MECHANIC'S TOOL

Raymond C. Bradwell and Alfred R. Miller,
Chicago, Ill.

Application June 13, 1947, Serial No. 754,460

1 Claim. (Cl. 33—206)

This invention relates to certain new and useful improvements in mechanic's tools and more particularly, though not limited, the invention relates to an arrangement for indicating by illumination the true level of a carpenter's level.

A principal object of the invention is the provision of means to indicate level testing by means of illumination.

Most carpenter's levels with which we are familiar, employ a bubble-presenting tube usually one at each end of the level and one arranged intermediate the ends, with the end tubes extending in different directions with respect to each other and with respect to the tube arranged intermediate the ends of the level. In many instances a mechanic or carpenter is unable to read the bubble tube of the level because of close quarters or because of insufficient light. Therefore, it is an object of this invention to provide with or without the bubble presenting tubes a means for indicating by illuminatiton the level of an object or plane being operated upon, this object in its preferred form of construction being accomplished by a plurality of lights, a medial one of which is utilized to indicate proper level and the other adjacent thereto and on opposite sides thereof to indicate an off level position.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a conventional level showing our invention associated therewith;

Fig. 2 is a vertical sectional detail view of the level attachment;

Fig. 3 is a sectional detail view taken substantially on line 3—3 of Fig. 2; and Fig. 4 is a diagrammatical view of a suggested circuit embodied in the invention.

The several objects of our invention are accomplished by the preferred form of construction which we have illustrated in the accompanying drawings.

While we have illustrated our invention associated with a carpenter's level, it is to be understood that we are not to be limited to a carpenter's level but that the invention may become a part of or associated with any other tool or instrumentality wherein by such tool or instrumentality a level or true surface is to be determined.

In the drawings we have shown at 10 a carpenter's level which is of conventional formation comprising sight openings 11 within which are arranged bubble-presenting tubes 12 of a well known construction and in common use with such a level.

Our invention includes a housing 13 which may be formed as an integral part of the level 11 or provided with integral lateral flanges 14 for attachment to the edge 15 of the level 10 by means of attaching screws 16. This housing 13 has a transverse opening 16' formed therein normally closed on opposite sides of the housing 13 by means of a transparent sheet 17.

Arranged within the housing 13 is a metallic track 18 comprising spaced conductor bars 19 and 19'. The conductor bar 19 comprises two substantially L-shaped formations to provide adjacent limb portions 20 and vertical extending portions 21. The limb portions 20 are spaced substantially from each other and arranged therebetween is a conductor point 22.

The conductor bar 19 further includes segmental track sections 23 spaced from the track sections 21.

The top wall of the housing 13 comprises a cap 25 formed of transparent material and within which is arranged a mounting block 26, the edge portions 27 of the cap 25 frictionally fitting upon the base portion 28 of the housing as shown in Figs. 2 and 3 at 26'.

Seated in openings 29 formed in the mounting block, which mounting block is formed of non-conductive material, are sockets 30 and threaded into these sockets 30 are suitable electric lamp bulbs 31, 32 and 33.

Arranged in the housing 13 for rolling contact with the tracks therein is a metallic ball 34.

The track sections 23 and 21 have arranged therebetween and separated therefrom conductor pins 24.

The track sections are connected in circuit with a suitable source of electric energy diagrammatically indicated at 35.

The operation of our device is as follows. When the level 10 is in a proper level position the ball 34 will have contact with the conductor point 22 and the conductor bar 19' thereby to connect the electric bulb 32 in circuit with the source of electric energy 35 as shown in Fig. 4 to indicate by illumination that the level is in a proper position.

When the level 10 is positioned on either of its ends the ball will rotate along the tracks and if the level is in a proper level position the ball will contact one of the conductor points 24 and the conductor bar 19' whereby to effect illumination of the lamp 32 for the purposes hereinbefore stated. However, when the level 10 is used with its long edge upon the work and a true level position is not had, the ball will engage one of the sections 20 and the conductor bar 19' and effect illumination of the electric bulb in circuit with that particular section 20. The same will take place when the ball contacts with either the track section 23 or 21. In other words, whenever the level is not in a true level position, the outer light corresponding to the side of the level not in true level position will become illuminated but when the level is in a true level position the center light bulb 32 will become illuminated and to so indicate a true level condition.

The source of electric energy is preferably in the form of small dry cell batteries and to accommodate these batteries we have included as an integral part of the housing 13 a battery compartment 36, Fig. 3.

From the foregoing description it is apparent that we have provided a simple and expeditious arrangement for indicating a true level position by illumination and that the arrangement will be as positive in detecting the level condition as the bubble presenting tubes 12.

Our device may be formed as an integral part of the tool or as before stated, it may be an attachment thereto.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

A mechanic's tool comprising a level, level-indicating means on the body comprising a housing, a raceway of U-shaped formation within the housing and providing a horizontal track and communicating vertical tracks at opposite ends of the horizontal track, a ball in said housing for movement through said raceway on said tracks, said tracks comprising parallelly related conductor bars including horizontal portions and communicating vertical portions, with one of the bars having its horizontal and vertical portions divided into sections, with adjacent ends of the sections in spaced relation with respect to each other, a contact member mounted between said adjacent ends in spaced relation with respect to such ends, illuminating means in said housing, and a circuit including a power source between said conductor bars and said contact member and said illuminating means.

RAYMOND C. BRADWELL.
ALFRED R. MILLER.

REFERENCES CITED

The following references are of record in the file of this patent:

UNITED STATES PATENTS

| Number | Name | Date |
|---|---|---|
| 1,729,227 | Reid | Sept. 24, 1929 |
| 2,105,147 | Inglis | Jan. 11, 1938 |
| 2,118,470 | Melvin | May 24, 1938 |
| 2,248,351 | Hughes et al. | July 8, 1941 |
| 2,286,014 | Howe | June 9, 1942 |
| 2,338,811 | Hasbrook | Jan. 11, 1944 |
| 2,482,504 | Pennington | Sept. 20, 1949 |

FOREIGN PATENTS

| Number | Country | Date |
|---|---|---|
| 20,476 | Australia | 1929 |
| 123,203 | Great Britain | 1919 |
| 465,373 | France | 1914 |

OTHER REFERENCES

Practical Ideas in American Machinist, Feb. 3, 1944, p. 99.